(12) United States Patent
Hirsch

(10) Patent No.: US 8,045,533 B2
(45) Date of Patent: Oct. 25, 2011

(54) ARBITRATING COLOCATED TRANSCEIVERS ASSOCIATED WITH DIFFERENT SYSTEMS

(75) Inventor: Olaf Hirsch, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 526 days.

(21) Appl. No.: 11/628,880

(22) PCT Filed: Jun. 7, 2005

(86) PCT No.: PCT/IB2005/051860
§ 371 (c)(1),
(2), (4) Date: Dec. 7, 2006

(87) PCT Pub. No.: WO2005/122431
PCT Pub. Date: Dec. 22, 2005

(65) Prior Publication Data
US 2007/0177542 A1    Aug. 2, 2007

Related U.S. Application Data

(60) Provisional application No. 60/578,020, filed on Jun. 7, 2004, provisional application No. 60/623,705, filed on Oct. 29, 2004.

(51) Int. Cl.
*H04W 4/00* (2009.01)
*H04L 12/413* (2006.01)
*H04M 1/00* (2006.01)

(52) U.S. Cl. ............ 370/338; 370/445; 455/552.1; 455/41.2

(58) Field of Classification Search ................ None
See application file for complete search history.

(56) References Cited

U.S. PATENT DOCUMENTS

| 6,842,607 | B2 * | 1/2005 | Godfrey et al. | 455/41.2 |
| 7,039,358 | B1 * | 5/2006 | Shellhammer et al. | 455/41.2 |
| 7,046,649 | B2 * | 5/2006 | Awater et al. | 370/338 |
| 7,116,938 | B2 * | 10/2006 | Monroe et al. | 455/41.2 |
| 2002/0061031 | A1 * | 5/2002 | Sugar et al. | 370/466 |
| 2002/0173272 | A1 | 11/2002 | Liang et al. | |
| 2003/0125019 | A1 | 7/2003 | Bajikar | |
| 2003/0214916 | A1 | 11/2003 | Khawand et al. | |
| 2004/0029619 | A1 * | 2/2004 | Liang et al. | 455/562.1 |
| 2004/0048577 | A1 * | 3/2004 | Godfrey et al. | 455/67.11 |
| 2004/0116075 | A1 * | 6/2004 | Shoemake et al. | 455/41.2 |
| 2004/0162106 | A1 * | 8/2004 | Monroe et al. | 455/552.1 |
| 2004/0192222 | A1 * | 9/2004 | Vaisanen et al. | 455/78 |

(Continued)

FOREIGN PATENT DOCUMENTS

WO         0184789  A2    11/2001

OTHER PUBLICATIONS

IEEE Std 802.15.2™-2003, Local and metropolitan area networks—Part 15.2: Coexistence of Wireless Personal.*

(Continued)

*Primary Examiner* — Jinsong Hu
*Assistant Examiner* — William Nealon

(57) ABSTRACT

Systems and methods according to the present invention provide arbitration methods, systems and devices which enable a WLAN transceiver (30) and a Bluetooth (BT) transceiver (32) to share the transmission medium. Various arbitration signals (BT, WL, RXIND and PRI) enable the transceivers to indicate a seizure of ownership of the medium as well as to accommodate special arbitration cases, e.g., priority packet transmission/reception. Some arbitration features are hardware programmable to provide design flexibility.

28 Claims, 5 Drawing Sheets

U.S. PATENT DOCUMENTS

2004/0242159 A1* 12/2004 Calderon et al. .............. 455/63.3
2005/0271010 A1* 12/2005 Capretta ........................ 370/329

OTHER PUBLICATIONS

I EEE Std 802.15.2TM-2003, Local and metropolitan area networks—Part 15.2: Coexistence of Wireless Personal.*

Koninklikjke Philips Electronics, N.V., International Preliminary Report on Patentability, Patent Cooperation Treaty, Dec. 8, 2006, p. 1-7.

* cited by examiner

ARBITRATING COLOCATED TRANSCEIVERS ASSOCIATED WITH DIFFERENT SYSTEMS

CROSS REFERENCE TO RELATED APPLICATION

This application claims the benefit of U.S. Provisional Application Ser. No. 60/578,020 filed Jun. 7, 2004, and 60/623,705 filed Oct. 29, 2004 which is incorporated herein whole by reference.

The present invention relates generally to wireless communication systems and, more particularly, to techniques for operating different transceivers, e.g., Bluetooth and wireless LAN transceivers, in proximity to one another.

Technologies associated with the communication of information have evolved rapidly over the last several decades. For example, over the last two decades wireless communication technologies have transitioned from providing products that were originally viewed as novelty items to providing products which are the fundamental means for mobile communications. Perhaps the most influential of these wireless technologies were cellular telephone systems and products. Cellular technologies emerged to provide a mobile extension to existing wireline communication systems, providing users with ubiquitous coverage using traditional circuit-switched radio paths. More recently, however, wireless communication technologies have begun to replace wireline connections in almost every area of communications. Wireless local area networks (WLANs) are rapidly becoming a popular alternative to the conventional wired networks in both homes and offices. At the same time, Bluetooth wireless links have become popular for other short range applications, e.g., wireless headsets, moving data between a PDA and a computer, etc.

Since WLAN and Bluetooth technologies both provide for short-range, wireless data communications, but for different applications, it has become more prevalent for WLAN and Bluetooth devices to be operated near one another. For example, as shown in FIG. 1(a), a headset can be communicating with a handset over a Bluetooth link during the same time that a wireless access point (AP) is communicating with the handset over a WLAN link. This usage scenario can cause interference between the Bluetooth and WLAN devices since they use partially overlapping bandwidths. As shown, for example, in FIG. 1(b), Bluetooth devices use frequency hopping as their access mechanism. Bluetooth transmitters hop between 79 1-MHz wide channels with 1600 hops per second. On the other hand, WLAN devices operating in accordance with IEEE 802.11b/g use the listen-before-talk (Carrier Sensing Multiple Access) mechanism. This mechanism employs three specific, non-overlapping, 22-MHz wide channels. As a result, there is a 27.8% chance (22 divided by 79) that a Bluetooth device will attempt to transmit inside a WLAN channel. Depending on the relative strength of the WLAN signal, either the Bluetooth signal or both the Bluetooth and WLAN signals will be corrupted and the receiver will not be able to decode the data.

In addition to the problems caused by overlapping channels, an additional problem arises in the increasingly common scenario in which both WLAN and Bluetooth transceivers are integrated into the same device, e.g., a mobile phone or a PDA. In this situation, signals transmitted from one transceiver in the device can cause the low-noise receiver amplifier (LNA), situated in front of the channel filter in the receive signal chain of the other transceiver, to become saturated. This co-location interference desensitizes the receiver of the other transceiver such that it cannot successfully receive its intended signal. Accordingly, it would be desirable to provide techniques and devices for permitting co-location of WLAN and Bluetooth transceivers while reducing or eliminating the co-location interference associated therewith.

Systems and methods according to the present invention address this need and others by providing arbitration methods, systems and devices which enable different transceivers, e.g., a WLAN transceiver and a Bluetooth (BT) transceiver, to share the transmission medium. Various arbitration signals enable the transceivers to indicate a seizure of ownership of the medium as well as to accommodate special arbitration cases, e.g., priority packet transmission/reception. Some arbitration features are hardware programmable to provide design flexibility.

According to one exemplary embodiment of the present invention, a method for arbitrating access to a wireless medium between a first transceiver and a second transceiver includes the steps of asserting, by the second transceiver, a first arbitration signal line when the first transceiver is to be prevented from transmitting, asserting, by the first transceiver, a second arbitration signal line when the second transceiver is to be prevented from transmitting, asserting, by the second transceiver, a third arbitration signal line when the second transceiver is to transmit or receive a priority packet; and asserting, by the first transceiver, a fourth arbitration signal line while the first transceiver evaluates an address associated with an incoming first packet.

According to another exemplary embodiment of the present invention, a transceiver system includes a first transceiver for transmitting and receiving first packets, a second transceiver for transmitting and receiving second packets and a plurality of arbitration signal lines connecting the first transceiver with the second transceiver, the plurality of arbitration signal lines including a first arbitration signal line, asserted by the second transceiver, when the first transceiver is to be prevented from transmitting, a second arbitration signal line, asserted by the first transceiver, when the second transceiver is to be prevented from transmitting, a third arbitration signal line, asserted by the second transceiver, when the second transceiver is to transmit or receive a priority packet and a fourth arbitration signal line, asserted by the first transceiver while the first transceiver evaluates an address associated with an incoming first packet.

The accompanying drawings illustrate exemplary embodiments of the present invention, wherein:

FIG. 1(a) conceptually illustrates a co-located WLAN transceiver and Bluetooth transceiver in a handset;

The following detailed description of the invention refers to the accompanying drawings. The same reference numbers in different drawings identify the same or similar elements. Also, the following detailed description does not limit the invention. Instead, the scope of the invention is defined by the appended claims.

Figure 1A:
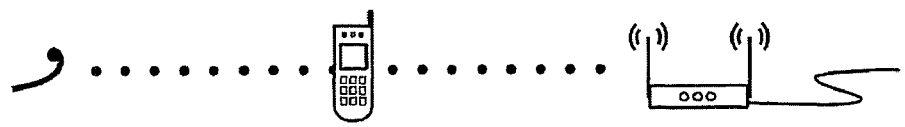
FIG. 1(b) illustrates transmissions associated with the WLAN transceiver and Bluetooth transceiver of FIG. 1(a)
Figure 1B:
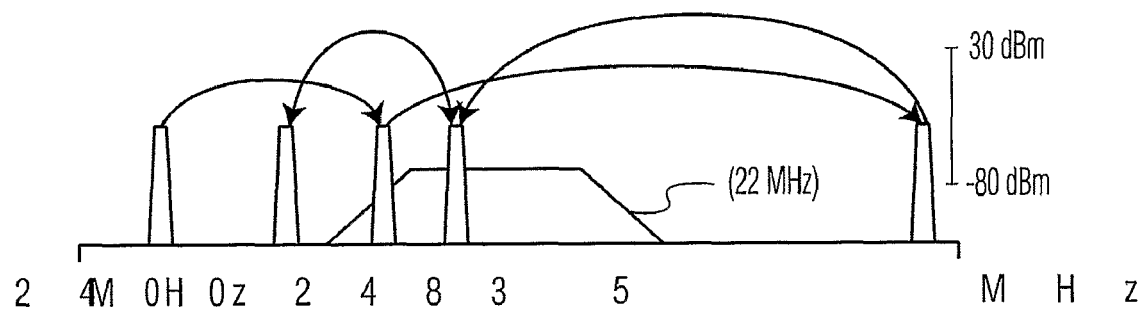
Figure 2:
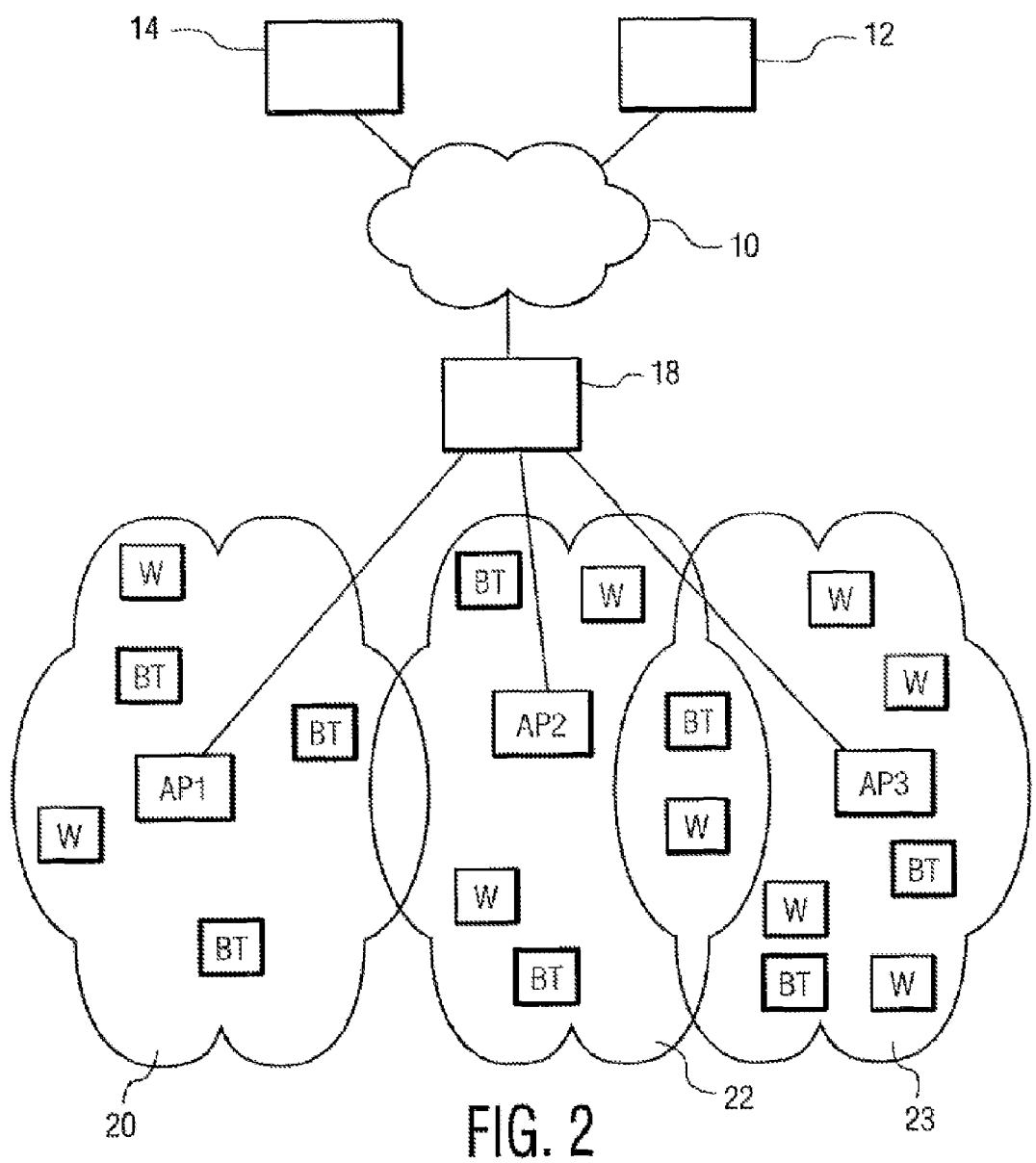
FIG. 2 depicts a WLAN/BT system in which the present invention can be implemented.

In order to provide some context for this discussion, an exemplary WLAN system will first be described with respect to FIG. 2. Those skilled in the art will appreciate, however, that the present invention is not restricted to implementation in any particular WLAN system. Therein, a wireline network 10 (e.g., an Ethernet network) has a file server 12 and workstation 14 connected thereto. Those skilled in the art will appreciate that typical wireline networks will serve numerous fixed workstations 14, however only one is depicted in FIG. 2 for simplicity. The wireline network 10 is also connected to a WLAN 16 via router 18. The router 18 interconnects the access points (AP) of the WLAN 16 with the wireline network, through which the access points can, for example, communicate with the file server 12. In the exemplary WLAN system of FIG. 2, three cells 20, 22 and 23 (also sometimes referred to as a Basic Service Set (BSS) or Basic Service Area (BSA) are shown each with a respective AP, although those skilled in the art will once again appreciate that more or fewer cells may be provided in WLAN 16. Within each cell, a respective AP serves a number of wireless stations (W) via a wireless connection. Note that wireless stations W may be any device, e.g., a personal computer, a personal digital assistant, a camera, a mobile phone, or any other device having one WLAN transceiver capable of communicating with a system via a WLAN technology operating in the ISM band (2.4 GHz), e.g., 802.11 b/g and which also have a Bluetooth transceiver integrated therein. Additionally, there are a number of devices which have Bluetooth transceivers, e.g., printers or headsets, within the cells 20, 22 and 23, and which communicate with the wireless stations W.

Figure 3:
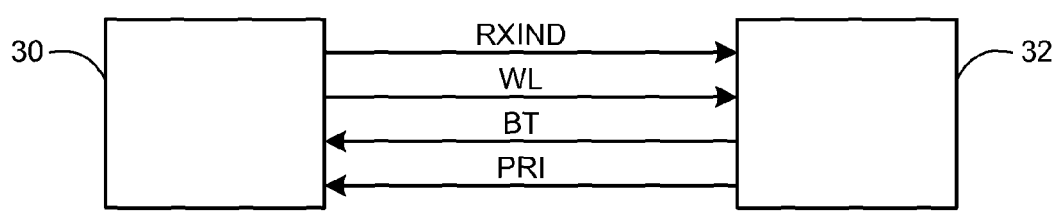
FIG. 3 depicts a transceiver system including a WLAN transceiver, a BT transceiver and a plurality of arbitration signal lines according to an exemplary embodiment of the present invention.
Figure 4:
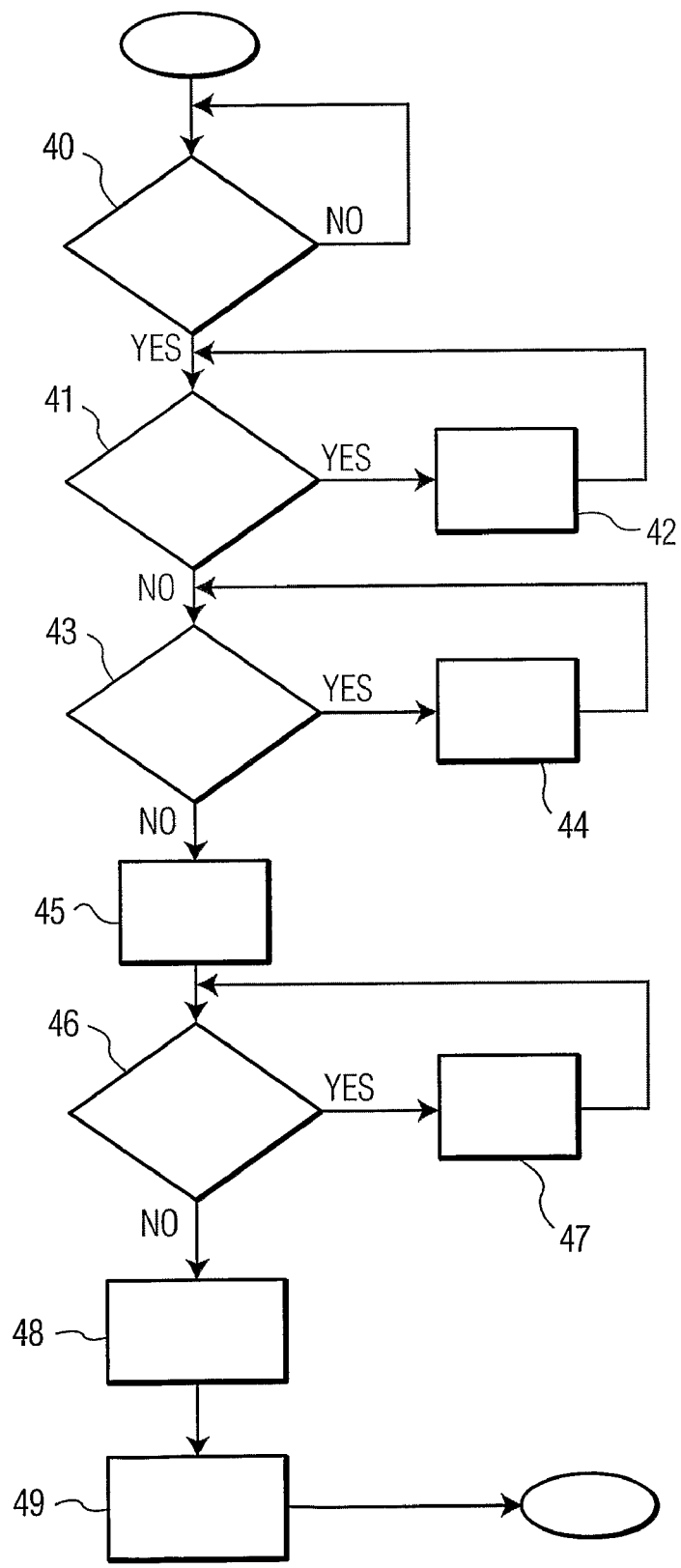
FIG. 4 is a flowchart depicting a method for arbitrating access to a transmission medium for Bluetooth packet transmission according to an exemplary embodiment of the present invention.

Each wireless station W has two transceivers 30 and 32, for WLAN transmission/reception (the "WLAN transceiver") and Bluetooth transmission/reception (the "BT transceiver") as shown in FIG. 3. According to this exemplary embodiment of the present invention, four arbitration signals RXIND, WL, BT AND PRI are employed to control transmissions from the two transceivers in a manner which is intended to reduce or eliminate the co-location interference associated with transmissions by the two transceivers 30 and 32. This exemplary embodiment also considers whether the Bluetooth transceiver is operating as a master or a slave device. According to one exemplary embodiment of the present invention, the arbitration scheme from the BT transceiver 32's perspective as a master operates as shown in the flowchart of FIG. 4. Therein, once the BT transceiver 32 has data to transmit at step 40, it checks the RXIND signal line at step 41. The RXIND signal is set to high when the WLAN transceiver 30 detects an incoming WLAN packet. This gives the WLAN transceiver 30 an opportunity to determine whether the incoming packet is one that it needs to read and possibly acknowledge or respond to, i.e., if it is a unicast frame addressed to the WLAN transceiver 30. Likewise, if the incoming WLAN packet is not intended for WLAN transceiver 30, then WLAN transceiver 30 will not assert the WL signal line to permit the BT transceiver 32 to use the medium. Thus, if RXIND is set to high, then the BT transceiver 32 waits for one Bluetooth packet duration at step 42.

The flow proceeds to step 43 wherein the BT transceiver 32 checks the WL signal line. The WL signal line is set to high when the WLAN transceiver 30 needs to reserve the right to transmit WLAN data. If the WL signal is high, the BT transceiver will wait via the loop through step 44 until the WLAN transceiver has set WL to low. Then the BT transceiver 32 will set the BT signal high at step 45 which will indicate to the WLAN transceiver 30 that it is reserving the medium to transmit BT data. At step 46, the BT transceiver checks the WL signal again. This step can be provided to exemplary embodiments of the present invention to guard against race conditions, e.g., if the WLAN transceiver 30 raises the WL signal at the same time that the BT transceiver 32 raises the BT signal. If the WLAN transceiver 30 has raised the WL signal between the time that the BT transceiver 30 checks the WL signal at steps 43 and 46, then the BT transceiver waits at step 47 for the WLAN transceiver to de-assert the WL signal line. Once step 46 results in a "NO" result, the flow proceeds to step 48 wherein the BT transceiver 32 proceeds to transmit a Bluetooth data frame.

Figure 5:
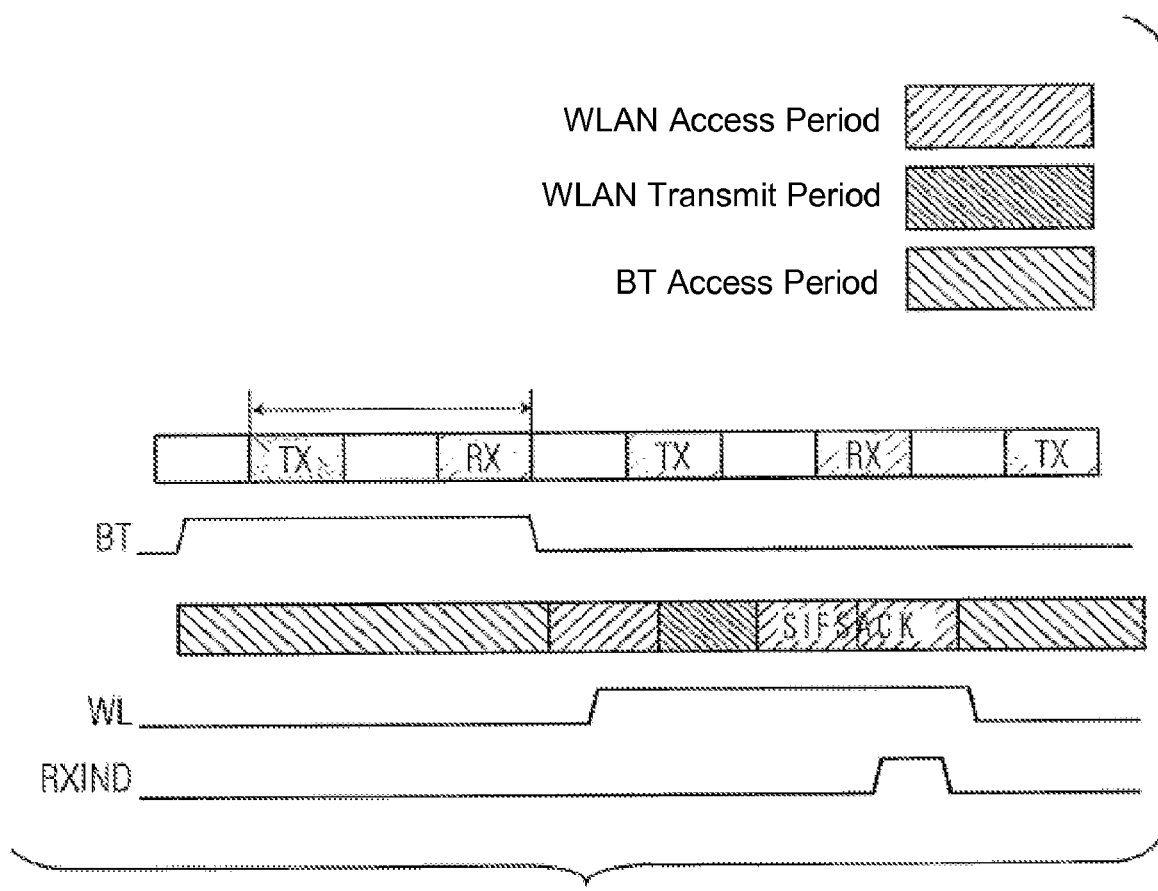
FIG. 5 is a timing diagram illustrating arbitration signals and air interface formats according to an exemplary embodiment of the present invention.

A BT transceiver 32 operating as a master will maintain the BT signal at a high level through the receive time period of the frame as illustrated in FIG. 5 to e.g., receive an acknowledgement. Note that in this example, the WL signal line and RXIND signal line are low throughout this period. Then, the BT transceiver 32 will lower the BT signal line at step 49 to permit the WLAN transceiver to access the medium. Alternatively, if the BT transceiver 32 is operating as a slave device, i.e., a device which awaits BT master transmissions and only responds to incoming traffic, then the BT transceiver 32 will assert the BT signal line before the RX time periods. If no packet is detected by the BT transceiver 32 operating in slave mode, then the BT transceiver 32 will immediately de-assert the BT signal line. If, on the other hand, the BT transceiver 32 does detect an incoming BT packet, then it will maintain the BT line in its high state to protect reception of the remainder of the packet and reserve the medium for the next transmit slot.

Figure 6:
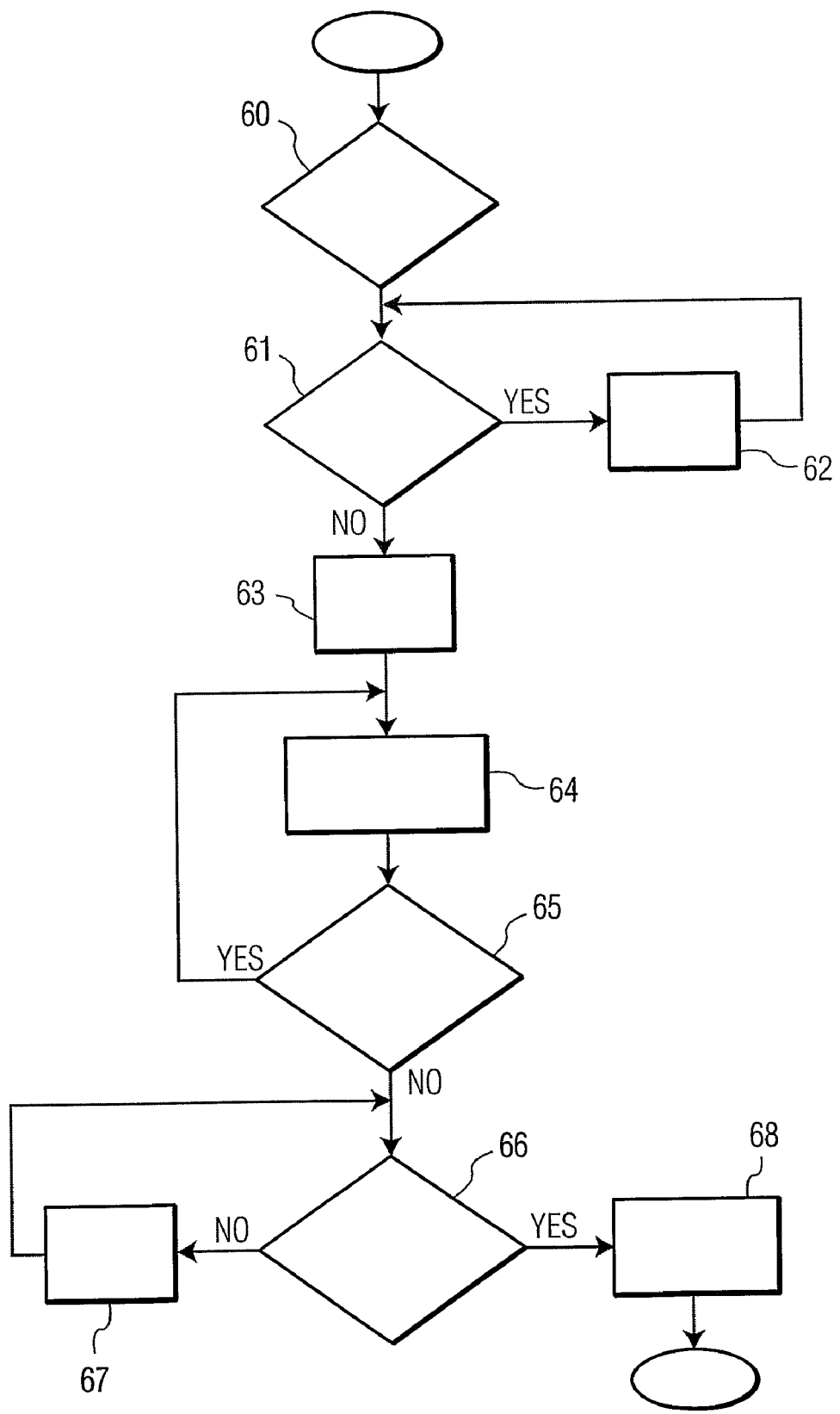
FIG. 6 is a flowchart depicting a method for arbitrating access to a transmission medium for Bluetooth packet transmission according to an exemplary embodiment of the present invention.

Turning now to WLAN transmission and reception, an exemplary method for arbitrating between WLAN transceiver 30 and BT transceiver 32 from the WLAN's perspective is illustrated in FIG. 6. Therein, when the WLAN transceiver 32 determines that it wants to transmit at step 60, it first checks the BT signal line at step 61. If the BT signal line is high, then the WLAN transceiver 30 will wait (step 62) until the BT signal line is de-asserted. Then, at step 63, the WLAN transceiver 30 will raise the WL signal to assert its ownership of the transmission medium. The timing of step 63 can vary according to exemplary embodiments of the present invention. As shown in FIG. 5, a backoff period is provided in WLAN systems during which time the WLAN transceiver 30 monitors the medium to see if other WLAN devices are accessing the medium. If the WLAN transceiver 30 determines that other WLAN devices are accessing the medium, it will stop and restart its backoff timer to delay access. Accordingly, exemplary embodiments of the present invention provide for the time at which the WL signal line is raised by the WL transceiver to be programmable to be at any point during the backoff period. According to one purely illustrative exemplary embodiment, the hardware portion of the medium access control layer of the WLAN transceiver 30 will assert the WL signal line a predetermined number of microseconds before the end of the backoff period. Alternatively, the system can adaptively vary the time within the backoff period during which the WL signal line will be raised based on e.g., traffic conditions.

After the WL signal line is raised at step 63, the WLAN transceiver will transmit a WLAN packet at step 64. If there are more packets to transmit, the flow will loop through steps 64 and 65 until all of the WLAN packets have been transmitted. Once the packet transmission has been completed, the WLAN transceiver will wait to receive acknowledgement packets from the AP at steps 66 and 67 or until the acknowledgement window has timed out. Then, at step 68, the WLAN transceiver 30 will lower the WL signal, thereby releasing the medium for use by the BT transceiver 32.

It may be desirable for the WLAN transceiver 30 to maintain the WL signal high for a time period beyond that dictated by the need to transmit packets and await acknowledgement, e.g., to accommodate fragmented frames, burst frames or other instances in which additional frames should be transmitted immediately by the WLAN transceiver. For example, fragmented frames and burst frames can be detected within a predetermined time period since they are separated by a single SIFS period. Accordingly, a programmable, extended WL high signal period can be provided for between steps 66 and 68. The extended WL high signal period is programmable to allow manufacturers, installers and/or other users to vary this period to balance the desire to avoid missing reception of, e.g., fragmented frames and burst frames, with the need to provide bandwidth to the BT transceiver 32. Yet another feature of exemplary embodiments of the present invention is the provision of another timer which starts after the WLAN transceiver de-asserts the WL signal line at step 68. This timer can be used to provide for a minimum time between two assertions of the WL signal line by the WL transceiver 30 to ensure that the BT transceiver 32 has periodic opportunities to transmit and/or receive incoming BT packets. This latter time period is variable and programmable.

On the receive side, as mentioned above, when the WLAN transceiver 30 detects an incoming WL packet preamble, it will raise the RXIND signal line until it has decoded the address associated with the incoming packet. If the incoming packet is addressed to the WLAN transceiver 30, then the WLAN transceiver 30 raises the WL signal for the duration of the packet reception. Additionally, if the received frame requires an acknowledgment or if a fragmented frame or burst frame is received, the WLAN transceiver 30 continues to assert the WL signal line until the frame exchange sequence has been completed. On the other hand, if the received WLAN frame is a broadcast frame or if the frame contains errors, the WLAN transceiver 30 can immediately de-assert the WL signal line as no further action on its part requires access to the transmission medium.

Returning to FIG. 3, the last arbitration signal to be discussed herein is the Bluetooth priority signal PRI. This signal enables the BT transceiver 32 to signal to the WLAN transceiver 30 that it has a high priority packet, e.g., HV3 packet used to convey voice data, to transmit or receive. If the high priority packet is to be transmitted by BT transceiver 32, then BT transceiver 32 raises the PRI signal line prior to transmitting. When the PRI signal line is asserted, the WLAN transceiver 30 will stop any ongoing transmissions and return the WL signal line to low. If the WLAN transceiver 30 is waiting to receive an acknowledgement packet or otherwise waiting to receive a packet, it can remain in receive mode albeit without the protection of a reserved medium. The RXIND signal line is not affected by the assertion of the PRI signal and will remain high as long as the WLAN transceiver 30 detects the presence of a packet. If the BT transceiver 32 is already the owner of the medium when it wants to send a priority packet, then the BT transceiver maintains the BT signal line high until the end of the next TX slot, otherwise it raises the BT signal as well.

If the high priority packet is to be received by the BT transceiver 32, then it raises the PRI signal at the beginning of the next RX slot (see FIG. 5). Then, at the beginning of the next TX slot, the BT transceiver 32 also raises the BT signal line. If the BT transceiver 32 already has ownership of the medium when it wants to receive a high priority packet, then it releases the BT signal line when it raises the PRI line. The foregoing exemplary arbitration process enables the system to distinguish between received BT high priority packets (PRI high, BT low) and transmitted BT high priority packets (both PRI and BT set high).

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for arbitrating access to a wireless medium between a first transceiver and a second transceiver, the method comprising:
    asserting, by said second transceiver a first arbitration signal line when said first transceiver is to be prevented from transmitting, wherein assertion of the first arbitration signal line by the second transceiver is at least partially dependent on a status of the second transceiver operating as a master or a slave for communications with another device using a same protocol as the second transceiver;
    asserting, by said first transceiver a second arbitration signal line when said second transceiver is to be prevented from transmitting;
    asserting, by said second transceiver a third arbitration signal line when said second transceiver is to transmit or receive a priority packet; and
    asserting, by said first transceiver a fourth arbitration signal line while said first transceiver evaluates an address associated with an incoming first packet;
    wherein the first, second, third, and fourth arbitration signal lines are separate dedicated lines, and each separate dedicated line independently asserts a corresponding distinct arbitration signal.

2. The method of claim 1, wherein said second transceiver and said first transceiver are co-located in a same device.

3. The method of claim 1, wherein said first transceiver is a WLAN transceiver and said second transceiver is a Bluetooth transceiver.

4. The method of claim 1, wherein asserting the second arbitration signal line further comprises:
    asserting, by said first transceiver said second arbitration signal line if said incoming first packet is addressed to said first transceiver or if said incoming first packet is a multicast packet.

5. The method of claim 1, wherein asserting the second arbitration signal line further comprises:
    maintaining said second arbitration signal line in an asserted state for a first period until said first transceiver has transmitted a plurality of first packets and received corresponding acknowledgement packets.

6. The method of claim 5, further comprising:
    extending said first period by a second period during which said second arbitration signal line remains in said asserted state to allow said first transceiver to detect fragmented frames or frame bursts.

7. The method of claim 6, wherein said second period is programmable in a hardware portion of a medium access control layer of said first transceiver.

8. The method of claim 1, wherein asserting the second arbitration signal line further comprises:
asserting, by said first transceiver said second arbitration signal line at a predetermined time during a backoff period associated with transmission of a packet.

9. The method of claim 8, wherein said predetermined time is hardware programmable in hardware associated with said first transceiver.

10. The method of claim 8, wherein said predetermined time is adaptively variable.

11. The method of claim 1, further comprising:
preventing successive assertions of said second arbitration signal line within a predetermined time, wherein said predetermined time is hardware programmable in hardware associated with said first transceiver.

12. The method of claim 1, further comprising:
determining, prior to asserting the second arbitration signal line, that said second arbitration signal line is not asserted;
checking, after asserting said first arbitration signal line, to ensure that said first arbitration signal line has not been raised; and
transmitting a packet by said second transceiver.

13. A transceiver system comprising:
a first transceiver for transmitting and receiving first packets;
a second transceiver for transmitting and receiving second packets; and
a plurality of arbitration signal lines connecting said first transceiver with said second transceiver, said plurality of separate dedicated arbitration signal lines, each configured to independently assert a corresponding distinct arbitration signal, comprising:
a first arbitration signal line asserted by said second transceiver when said first transceiver is to be prevented from transmitting, wherein assertion of the first arbitration signal line by the second transceiver is at least partially dependent on a status of the second transceiver operating as a master or a slave for communications with another device using a same protocol as the second transceiver;
a second arbitration signal line asserted by said first transceiver when said second transceiver is to be prevented from transmitting;
a third arbitration signal line asserted by said second transceiver when said second transceiver is to transmit or receive a priority packet; and
a fourth arbitration signal line asserted by said first transceiver while said first transceiver evaluates an address associated with an incoming first packet.

14. The system of claim 13, wherein said second transceiver and said first transceiver are co-located in a same device.

15. The system of claim 13, wherein said first transceiver is a WLAN transceiver, said first packets are WLAN packets, said second transceiver is a Bluetooth transceiver and said second packets are Bluetooth packets.

16. The system of claim 13, wherein said first transceiver asserts said second arbitration signal line if said incoming first packet is addressed to said first transceiver or if said incoming first packet is a multicast packet.

17. The system of claim 13, wherein said first transceiver maintains said second arbitration signal line in an asserted state for a first period until said first transceiver has transmitted a plurality of first packets and received corresponding acknowledgement packets.

18. The system of claim 17, wherein said first transceiver extends said first period by a second period during which said second arbitration signal line remains in said asserted state to allow said first transceiver to detect fragmented frames or frame bursts.

19. The system of claim 18, wherein said second period is programmable in hardware associated with said first transceiver.

20. The system of claim 13, wherein said first transceiver asserts said second arbitration signal line at a predetermined time during a backoff period associated with transmission of a first packet.

21. The system of claim 20, wherein said predetermined time is hardware programmable in hardware associated with said first transceiver.

22. The system of claim 20, wherein said predetermined time is adaptively variable.

23. The system of claim 13, wherein said system prevents successive assertions of said second arbitration signal line within a predetermined time, wherein said predetermined time is hardware programmable in hardware associated with said first transceiver.

24. The system of claim 13, wherein said second transceiver determines that said second arbitration signal line is not asserted prior to asserting said first arbitration signal line, and wherein said second transceiver checks, after asserting said first arbitration signal line, to ensure that said first arbitration signal line has not been raised and then transmits a second packet.

25. The method of claim 1, further comprising:
asserting, by the second transceiver, the third arbitration signal line while deasserting the first arbitration signal line for reception of a high priority packet; and
asserting, by the second transceiver, both the third arbitration signal line and the first arbitration signal line together for transmission of a high priority packet from the second transceiver to the other device.

26. The method of claim 1, further comprising, in response to an assertion of the third arbitration signal line by the second transceiver, deasserting the second arbitration line and stopping an ongoing transmission of the first transceiver, wherein the fourth arbitration signal line is unaffected by the assertion of the third arbitration signal line by the second transceiver.

27. The system of claim 13, wherein the second transceiver is configured to assert the third arbitration signal line and deassert the first arbitration signal line for reception of a high priority packet, and is further configured to assert both the third arbitration signal line and the first arbitration signal line together for transmission of a high priority packet from the second transceiver to the other device.

28. The system of claim 13, wherein the first transceiver is configured to deassert the second arbitration line and stop an ongoing transmission of the first transceiver in response to an assertion of the third arbitration signal line by the second transceiver, wherein the fourth arbitration signal line is unaffected by the assertion of the third arbitration signal line by the second transceiver.

* * * * *